(No Model.) 4 Sheets—Sheet 1.

J. H. PATTERSON.
CASH INDICATOR AND REGISTER.

No. 382,552. Patented May 8, 1888.

Witnesses:
W. C. Jirdinston.
Charles Billow.

Inventor,
John H. Patterson.
by Peck & Rector,
his Attorneys.

(No Model.) 4 Sheets—Sheet 2.

J. H. PATTERSON.
CASH INDICATOR AND REGISTER.

No. 382,552. Patented May 8, 1888.

Witnesses:
W. C. Jirdinston.
Charles Billon.

Inventor.
John H. Patterson.
Peck & Rector
his Attorneys.

(No Model.) 4 Sheets—Sheet 3.

J. H. PATTERSON.
CASH INDICATOR AND REGISTER.

No. 382,552. Patented May 8, 1888.

Witnesses.
W. C. Jirdinston.
Charles Billow.

Inventor.
John H. Patterson.
by Peck & Rector
his Attorneys.

(No Model.) 4 Sheets—Sheet 4.

J. H. PATTERSON.
CASH INDICATOR AND REGISTER.

No. 382,552. Patented May 8, 1888.

Witnesses:
W. C. Jirdinston.
Charles Billow.

Inventor:
John H. Patterson,
by Peck & Rector,
his Attorneys.

United States Patent Office.

JOHN H. PATTERSON, OF DAYTON, OHIO.

CASH INDICATOR AND REGISTER.

SPECIFICATION forming part of Letters Patent No. 382,552, dated May 8, 1888.

Application filed January 24, 1887. Serial No. 225,252. (No model.)

*To all whom it may concern:*

Be it known that I, JOHN H. PATTERSON, a citizen of the United States, residing at Dayton, in the county of Montgomery and State of Ohio, have invented certain new and useful Improvements in Cash Registers and Indicators, of which the following is a full, clear, and exact description, reference being had to the accompanying drawings, forming part of this specification.

My invention relates to an improvement in cash registers and indicators designed for the use of store-keepers and others as a means of accurately registering the total cash receipts for any given period of time—as a day, for instance—and for indicating to the customers that the amount paid has been registered by disclosing to their view such amounts upon figured tablets. Like the machine shown in Patent No. 271,363 to Ritty and Birch, the arrangement and operation of the parts are such that no tablet can be exhibited without its value being counted upon the registering mechanism, and whenever any tablet is disclosed it remains so until the machine is operated to disclose a second tablet.

My present invention has for its object the simplification of the registering mechanism, as well as the increased efficiency of the machine, and its novelty will be herein set forth, and specifically pointed out in the claims.

Figure 1:
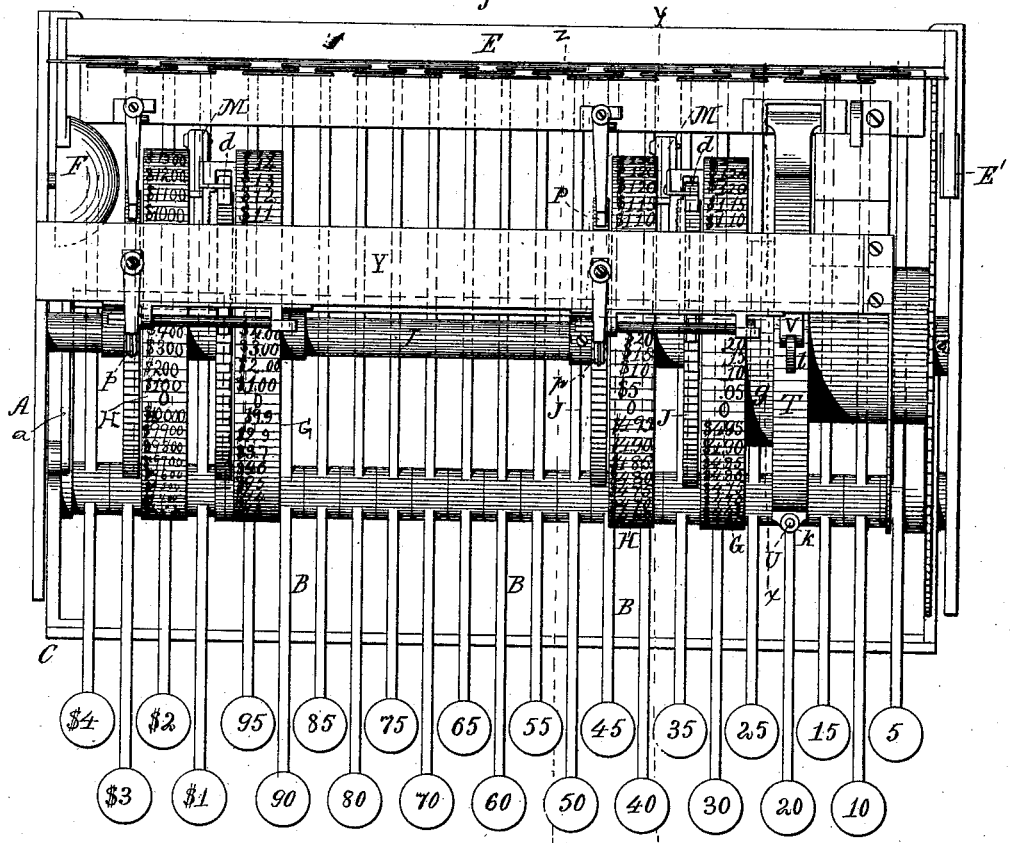
Figure 2:
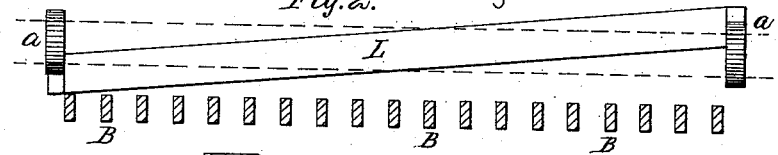
Figure 3:
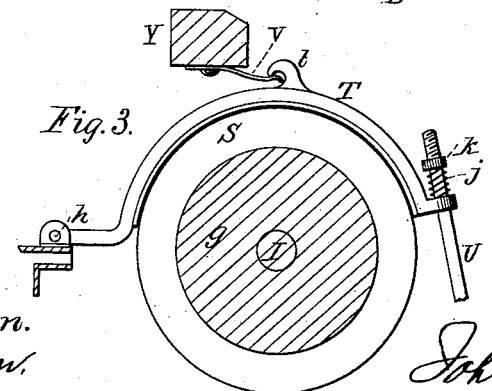
Figure 4:
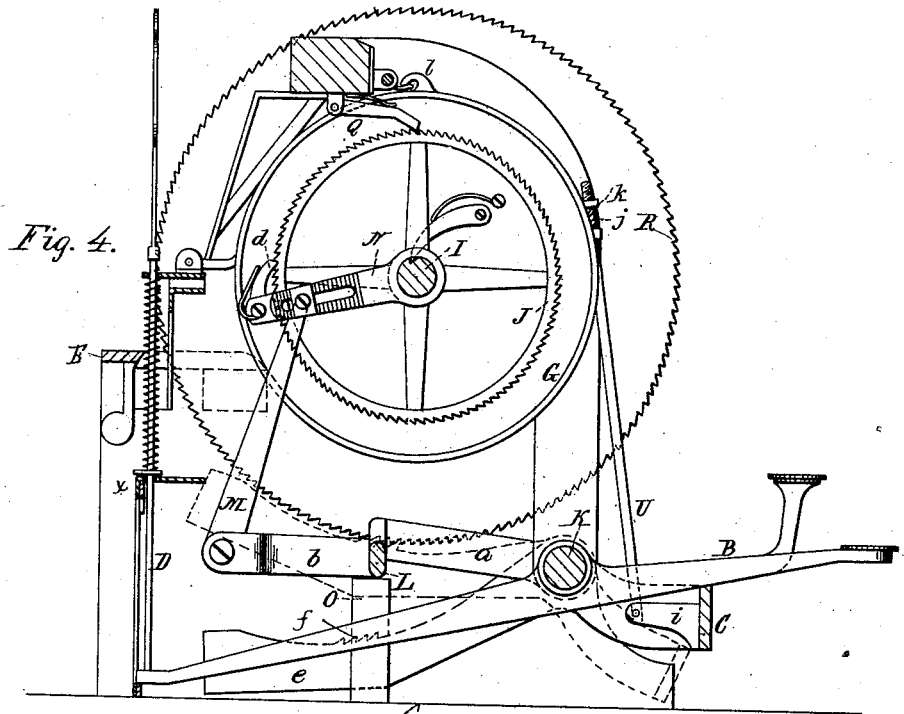
Figure 5:
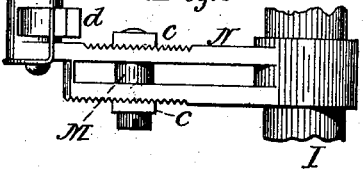
Figure 6:
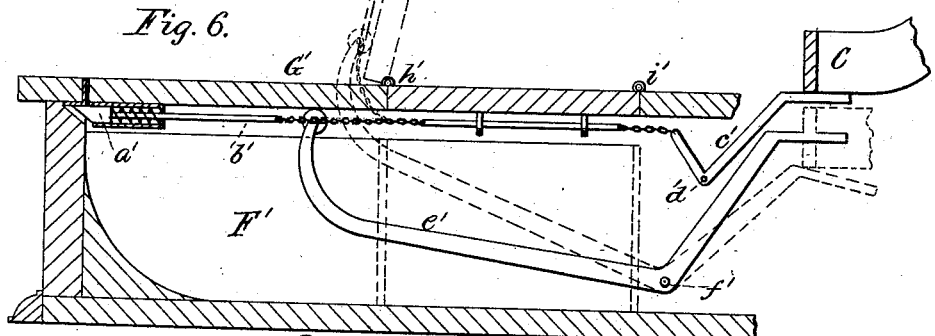
Figure 7:
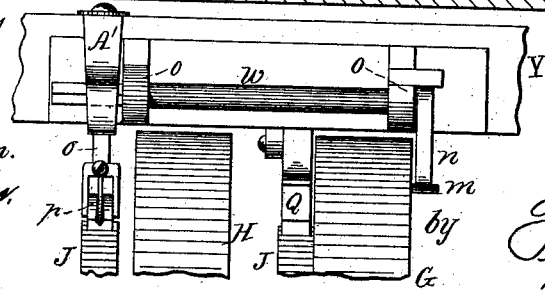
Figure 8:
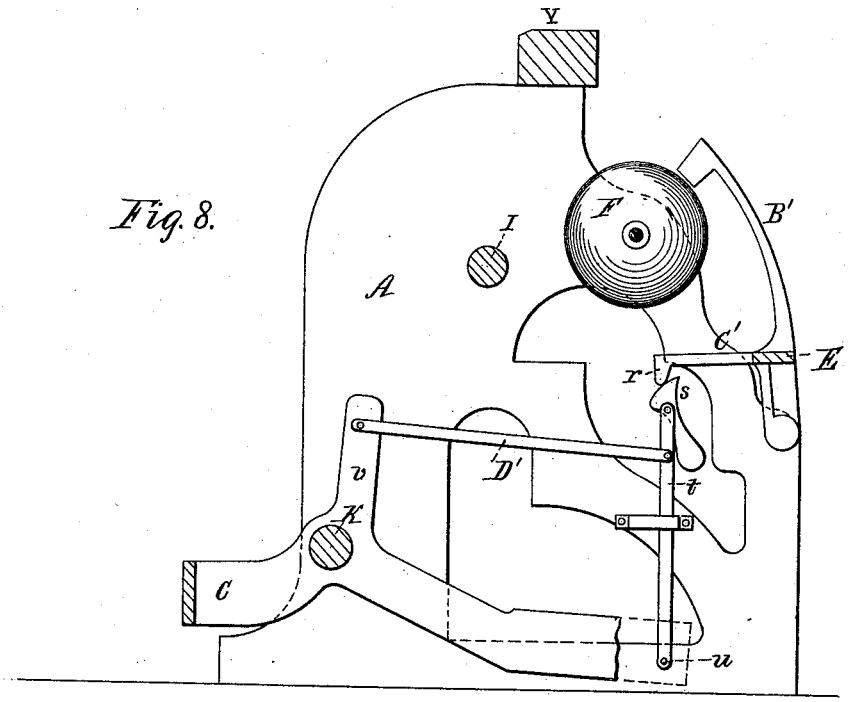
Figure 9:
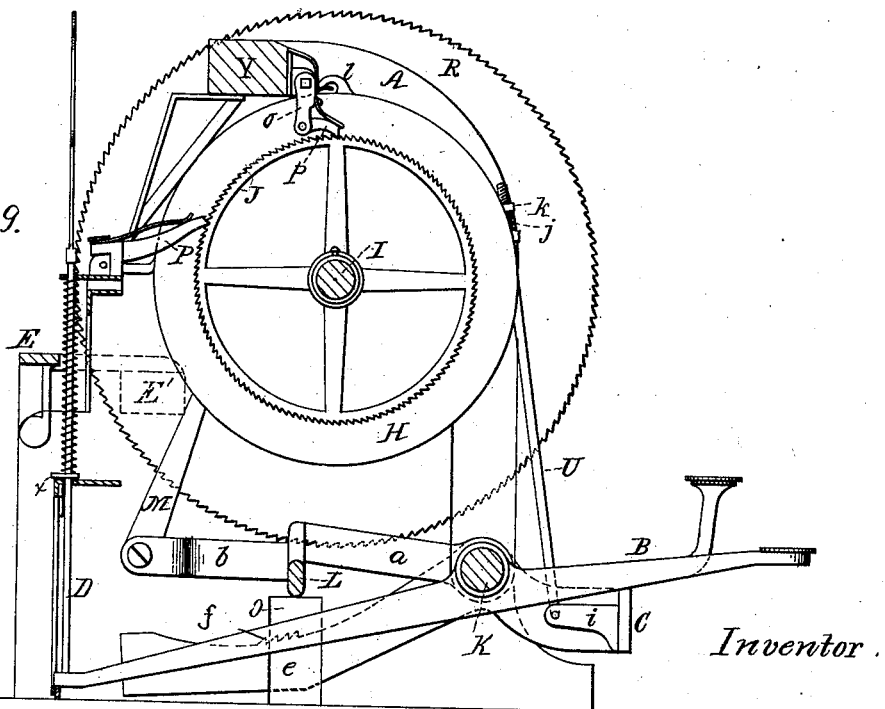
Figure 10:
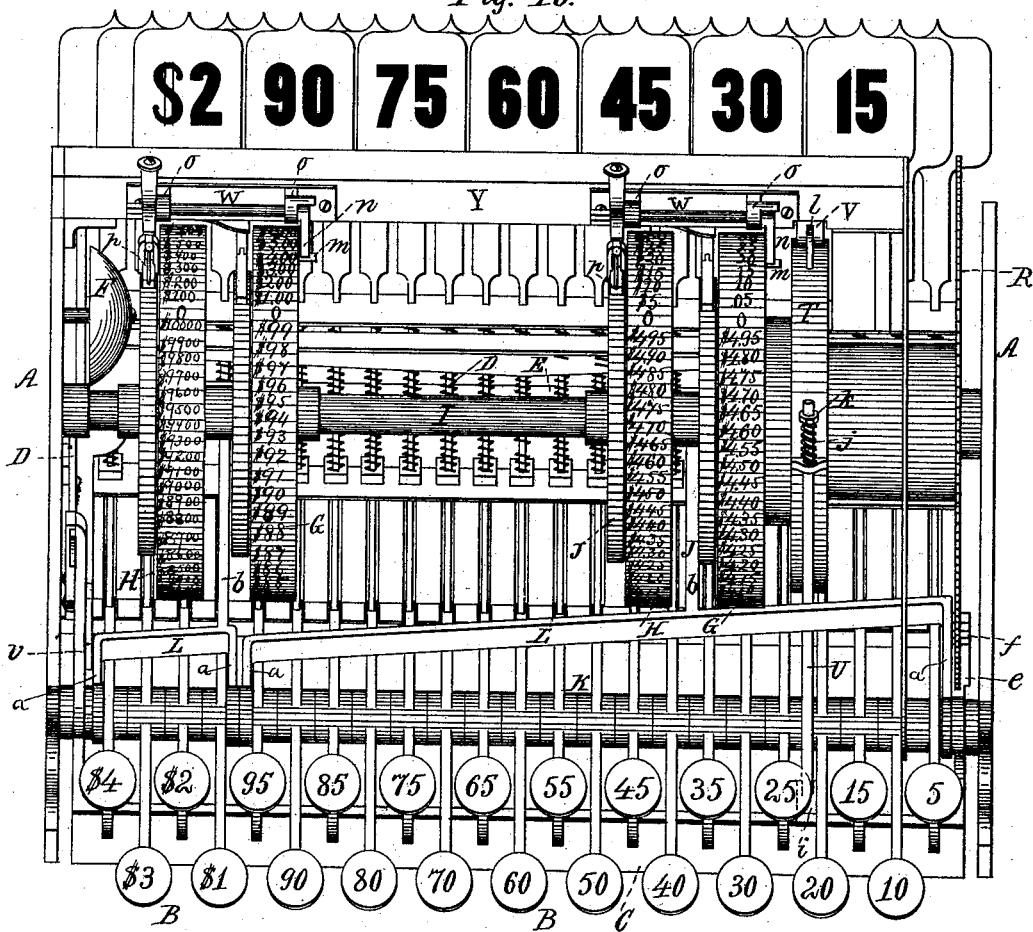

In the accompanying drawings, Figure 1 is a plan view of a machine embodying my invention with the casing removed. Fig. 2 is a front elevation in detail of the inclined bar for actuating the registering mechanism. Fig. 3 is a sectional detail in end elevation through the dotted line $x\ x$ of Fig. 1. Fig. 4 is a sectional end elevation of the machine through the dotted line $y\ y$ of Fig. 1. Fig. 5 is an enlarged detail plan view of the coupling-crank and its dog. Fig. 6 is a sectional side elevation of the till and its mechanism. Fig. 7 is an enlarged front elevation in detail of the mechanism for communicating motion from one registering-wheel to the next. Fig. 8 is a sectional end elevation of the machine, showing the gong and wing actuating mechanisms. Fig. 9 is a sectional end elevation of the machine through the dotted lines $z\ z$ of Fig. 1. Fig. 10 is a top view of the machine with the casing removed, looking in the direction of the arrow, Fig. 4.

The same letters of reference are used to indicate identical parts in all the figures.

The frame-work, casing, and general construction of the machine are substantially the same as those of the Ritty and Birch patent, No. 271,363, of January 30, 1883, with the exceptions to be hereinafter pointed out; and it is sufficient here to say that A is the frame-work; B, the keys of fixed values; C, the vibrating frame; D, the tablet-rods; E, the supporting-wing for the tablet-rods, and F the gong.

In this instance I have provided two sets of keys, the first representing cents in a series of five, ten, fifteen, and so on up to ninety-five, and the second set representing dollars in a series of one, two, three, and so on up as high as may be desired. There are but two registering-wheels, G H, for each of these sets. These wheels are loosely journaled upon a shaft, I, which is in turn journaled in the frame-work above and transversely of the keys. The first of these wheels is numbered upon its periphery in a series of 0, 5, 10, and so on up to $4.95, while the second is numbered in a series from 0, $5, $10, and so on up to $495. Secured to each of the wheels G H, at their sides, is a ratchet-wheel, J, having as many teeth as there are rows of numbers upon the wheels. Hung loosely upon the key-shaft K by arms $a$ are in this instance two inclined bars, L, each extending over one set of keys and free to be vibrated independently of each other. The inclination of these bars is with reference to the line of the keys when in their normal position of rest—that is to say, the bar may rest directly upon the ninety-five-cent key, while it is some distance from the five-cent key, as seen in Fig. 2, the keys being indicated in Fig. 10. As the keys all have the same limit of play or stroke, the purpose of this inclination will presently be apparent.

Each bar L has a rearwardly-extending arm, $b$, to which is pivoted an upwardly-extending bar, M, adjustably pivoted by means of serrated nuts $c$ to a slotted crank-arm, N, loosely hung upon the shaft I, and having its sides serrated, as shown more particularly in Fig.

5. Pivoted upon the outer end of the crank-arm N is a spring-dog, d, constantly engaging with the ratchet-wheel J of the register-wheel G. Stops O, made adjustable, if desired, support the bars L when down in their normal position of rest.

P Q are spring check-dogs pivoted to the main frame and engaging with the ratchets J, as seen in Figs. 4 and 9, to serve as brakes and prevent the returning of the register-wheels, as will be readily understood.

The first or five-cent key is, as before stated, at such distance from frame L that the latter will not be touched by it until just before the key reaches the limit of its motion. Consequently the frame will be operated through the distance of one tooth of the registering-wheel, while the ninety-five-cent bar being in contact with bar L when this key is operated the bar begins to move immediately, and upon the completion of the key's excursion will have moved the pawl over nineteen of the registering-teeth. The same general relation is maintained with relation to the dollar or tens series of keys, the highest-numbered key being in contact with L, while the lowest numbered is arranged to nearly complete its movement when the frame is operated, and the intermediate keys are arranged with relation to the bar at proportional distances, depending upon their values. The tablet-spindles are arranged to be operated from the ends of the keys and supported upon a wing in the manner common in this class of machines, and the gong-sounding apparatus is operated from the frame C in a manner to be farther on described, and at present it is only necessary to state that for every movement of the frame C the bell is sounded. The details will be farther on described. It results from this construction and the adjustment of the parts that when the ninety-five-cent key is operated to its fullest extent to expose its tablet and sound the gong the inclined bar L will be raised to its farthest extent, or a distance just sufficient to turn the ratchet-wheel and its register-wheel G nineteen notches through the medium of the arms b, M, and N and dog d, and thus, supposing the register-wheels to have shown 0 under their reading-openings, expose the number 95 through the reading-opening of the wheel G. The weight of the parts is sufficient to retract the bar L when the key is released. Now, should the five-cent key be operated to its farthest limit, thereby exposing its tablet and sounding the gong, the bar L would only be raised just sufficiently to turn the ratchet-wheel of the register-wheel G one notch, and $1.00 would appear under the reading-opening, and so on, each key serving to elevate the bar just sufficiently to turn the ratchet-wheel as many notches as the value of said key divided by five would represent.

While I have shown the inclined bars located above the keys, it is of course apparent that they might be under the keys, in which event the keys would be provided with hooks extending down so as to engage with the under side of the bars, as will be readily understood.

Although an inclined bar has been described, it will be understood not to necessarily apply to a bar constructed the same width or thickness its entire length; but it is only essential that the lower side, or the one acted upon by the key-levers, be inclined.

To prevent the sudden and violent operation of the keys from throwing the register-wheels farther forward than the exact number of notches requisite, I have shown two forms of brake mechanism, either or both of which may be employed, as may be desired or found necessary. The first and most positive of these is a large ratchet-wheel, R, Figs. 1 and 4, keyed or otherwise secured to a hub upon the register-wheel G and turning therewith. It is of such size and so located that when the vibrating frame C has been fully depressed the weighted end e of said frame, which has serrations f upon its upper side, comes in contact with said wheel R and positively stops the same by the serrations engaging with the ratchets, as seen by the dotted lines in Fig. 4.

The other form of brake is more particularly shown in Fig. 3, where S represents a brake-wheel upon the hub g of the register-wheel.

T is a brake-shoe pivoted, as at h, to the frame extending over said brake-wheel, and connected by a rod, U, to an arm, i, upon the forward part of the vibrating frame. The connection between the rod U and brake-shoe is obtained by a spring, j, and nut k, as seen in Fig. 3, the rod passing freely through an opening in the flanged end of the shoe.

V is a retracting-spring, which, engaging with a hook, l, upon the brake-shoe, serves to hold the shoe up away from the wheel, except when a key is being operated, by which action the shoe is brought down upon and brakes the wheel S.

To cause the turning of the register-wheel H one notch for every complete revolution of the wheel G, I have provided the mechanism shown in Figs. 1, 7, and 9, where the wheel G has upon one side a projecting pin or stud, m, which at every complete revolution of said wheel strikes and vibrates an arm, n, upon the end of a rock-shaft, W, journaled in blocks o upon the cross-bar Y of the main frame. The opposite end of this rock-shaft is provided with an arm carrying a pivoted spring-dog, p, engaging with the ratchet-wheel J of the register-wheel H. The extent of vibration of the arm n is so adjusted that the rock-shaft is turned just sufficiently to cause the dog p to turn the ratchet J one notch.

A' is a resetting spring bearing upon the arm o, to cause the resetting of the dog, as will be readily understood.

The operation of frame C and tablets will be readily understood by reference to the drawings by those skilled in the art to which this specification is addressed. When any of the keys are operated, the under side engaging with the frame C causes its vibration and the operation of the gong-sounding apparatus, as hereinafter described, while the end of the key lifts the appropriate tablet-spindle and causes the projection $x$ thereon to become engaged by the wing E and to be held until released by the device about to be described operating from the frame C.

Another feature of my invention, which relates to the tripping mechanism of the tablet-supporting wing and gong-hammer, is shown in Fig. 8, where the wing E carries at its end next the gong a hammer, B', and an extension, C', having at its end a pendent rounded or beveled nose, $r$, with which engages a dog, $s$, pivoted to an arm, $t$, whose lower end is pivoted, as at $u$, to the frame. The dog $s$ is free to vibrate forward, but not backward, and its engaging surface is rounded or beveled, as shown.

D' is the draw-bar, connecting the arm $t$ with the arm $v$ of the vibrating frame.

By this construction whenever a key is operated the tilting of the vibrating frame draws forward the dog $s$, raises the extension C', and throws back the wing to permit the passage of the tablet-rod, and the adjustment of the parts is such that just as the key has about reached its farthest limit of depression the dog $s$ has passed the nose $r$, whereupon the weight E' (see dotted lines, Fig. 9) or a spring resets the wing and causes the hammer to strike the gong. The release of the key and retraction of the vibrating frame resets the dog $s$, which passes freely back under and re-engages with the nose $r$.

The remaining feature of my invention is illustrated in Fig. 6, where the case of the machine is extended outward to form a till-compartment, F', with a hinged lid or cover, G'. This lid is held locked by a spring-bolt, $a'$, on its under side, actuated by a draw-rod, $b'$, connected to a bell-crank arm, $c'$, pivoted, as at $d'$, and having a lip extending under the vibrating frame C in such manner that the first movement of the frame when a key is operated vibrates the bell-crank $c'$ and draws back the bolt. Other arms, $e'$, pivoted, as at $f'$, and carrying rollers $g'$, which bear upon the under side of the lid, are so arranged that the further depression of the frame C under the action of the key causes the lid to be opened and thrown up, as seen by the dotted lines. If desired, the lid may be hinged both at $h'$ and $i'$, thus forming a double-hinged lid. The arms $e'$ are preferably at each side of the till-compartment, and the draw-bar of the bolt is made flexible by link-connections, as shown, or in any other suitable manner.

Having thus fully described my invention, I claim—

1. In a cash register and indicator, the combination, with a series of keys of fixed values and a registering-wheel, of a bar located transversely across and inclined relatively to the plane of the keys, and connecting mechanism between said bar and registering-wheel, whereby the operation of any key causes its value to be registered on said registering-wheel, substantially as described.

2. In a cash register and indicator, the combination, with a series of keys of fixed values and a registering-wheel, of a bar extending transversely across the keys and having a vertically-inclined operating side, and connecting mechanism between said bar and registering-wheel, whereby the operation of any key causes its value to be registered on said registering-wheel, substantially as described.

3. In a cash register and indicator, the combination, with a series of keys of fixed values and a registering-wheel provided with a ratchet, of a bar located transversely across and inclined relatively to the plane of the keys, and a pawl actuated by said bar and engaging with the ratchet of the registering-wheel, whereby the operation of any key causes its value to be registered on said registering-wheel, substantially as described.

4. In a cash register and indicator, the combination, with a series of keys of fixed values and a registering-wheel provided with a ratchet, of a bar extending transversely across the keys and having a vertically-inclined operating side, and a pawl actuated by said bar and engaging with the ratchet of the registering-wheel, whereby the operation of any key causes its value to be registered on said registering-wheel, substantially as described.

5. In a cash register and indicator, the combination, with a series of keys of fixed values and a registering-wheel, of a bar located transversely across the keys and inclined relatively to the plane of the keys, and connecting mechanism between said bar and registering-wheel, and brake mechanism applied to said registering-wheel, whereby the operation of any key causes its value to be registered on said registering-wheel, substantially as described.

6. In a cash register and indicator, the combination, with a series of keys of fixed values and a registering-wheel, of a bar extending transversely across the keys and having a vertically-inclined operating side, connecting mechanism between said bar and registering-wheel, and brake mechanism applied to said registering-wheel, whereby the operation of any key causes its value to be registered on said registering-wheel, substantially as described.

7. In a cash register and indicator, the combination, with a series of keys of fixed values and a registering-wheel provided with a ratchet, of a bar located transversely across the keys and inclined relatively to the plane of the keys, a pawl actuated by said bar and engaging with the ratchet of the registering-wheel, and brake mechanism applied to said registering-wheel, whereby the operation of any key causes its value to be registered on said registering-wheel, substantially as described.

8. In a cash register and indicator, the combination, with a series of keys of fixed values and a registering-wheel provided with a ratchet, of a bar extending transversely across the keys and having a vertically-inclined operating side, a pawl actuated by said bar and engaging with the ratchet of the registering-wheel, and brake mechanism applied to said registering-wheel, whereby the operation of any key causes its value to be registered on said registering-wheel, substantially as described.

9. In a cash register and indicator, the combination, with a series of keys of fixed values pivoted upon horizontal axes and a registering-wheel, of a bar extending transversely across the keys, with which the latter engage when moved on their pivots, the portions of said bar with which the different keys engage being arranged at different distances from said keys, and connecting mechanism between said bar and registering-wheel, substantially as described.

10. In a cash register and indicator, the combination, with a series of keys of fixed values, a series of tablet-rods and tablets actuated by said keys for exposing to view the value of any key operated, and a registering-wheel, of a bar located transversely across and inclined relatively to the plane of the keys, and connecting mechanism between said bar and registering-wheel, whereby the operation of any key causes its tablet to be exposed to view and registers its value on said registering-wheel, substantially as described.

11. In a cash register and indicator, the combination, with a series of keys of fixed values, a series of tablet-rods and tablets actuated by said keys for exposing to view the value of any key operated, and a registering-wheel, of a bar having a vertically-inclined operating side located transversely across the keys and connecting mechanism between said bar and registering-wheel, whereby the operation of any key causes its tablet to be exposed to view and registers its value on said registering-wheel, substantially as described.

12. In a cash register and indicator, the combination, with a series of keys of fixed values, a series of tablet-rods and tablets actuated by said keys for exposing to view the value of any key operated, and a registering-wheel provided with a ratchet, of a bar located transversely across and inclined relatively to the plane of the keys, and a pawl actuated by said bar and engaging with the ratchet of the registering-wheel, whereby the operation of any key causes its tablet to be exposed to view and registers its value on said registering-wheel, substantially as described.

13. In a cash register and indicator, the combination, with a series of keys of fixed values, a series of tablet-rods and tablets actuated by said keys for exposing to view the value of any key operated, and a registering-wheel provided with a ratchet, of a bar extending transversely across the keys and having a vertically-arranged operating side, and a pawl actuated by said bar and engaging with the ratchet of the registering-wheel, whereby the operation of any key causes its tablet to be exposed to view and registers its value on said registering-wheel, substantially as described.

14. In a cash register and indicator, the combination, with a series of keys of fixed values, a series of tablet-rods and tablets actuated by said keys for exposing to view the value of any key operated, and a registering-wheel, of a bar located transversely across and inclined relatively to the plane of the keys, connecting mechanism between said bar and registering-wheel, and brake mechanism applied to said registering-wheel, whereby the operation of any key causes its tablet to be exposed to view and registers its value on said registering-wheel, substantially as described.

15. In a cash register and indicator, the combination, with a series of keys of fixed values, a series of tablet-rods and tablets actuated by said keys for exposing to view the value of any key operated, and a registering-wheel, of a bar extending transversely across the keys and having a vertically-inclined operating side, connecting mechanism between said bar and registering-wheel, and brake mechanism applied to said registering-wheel, whereby the operation of any key causes its tablet to be exposed to view and its value to be registered on said registering-wheel, substantially as described.

16. In a cash register and indicator, the combination, with a series of keys of fixed values, a series of tablet-rods and tablets actuated by said keys for exposing to view the value of any key operated, and a registering-wheel provided with a ratchet, of a bar located transversely across and inclined relatively to the plane of the keys, a pawl actuated by said bar and engaging with the ratchet of the registering-wheel, and brake mechanism applied to said registering-wheel, whereby the operation of any key causes its tablet to be exposed to view and registers its value on said registering-wheel, substantially as described.

17. In a cash register and indicator, the combination, with a series of keys of fixed values, a series of tablet-rods and tablets actuated by said keys for exposing to view the value of any key operated, and a registering-wheel provided with a ratchet, of a bar extending transversely across the keys and having a vertically-inclined operating side, a pawl actuated by said bar and engaging with the ratchet of the registering-wheel, and brake mechanism applied to said registering-wheel, whereby the operation of any key causes its tablet to be exposed to view and registers its value on said registering-wheel, substantially as described.

18. In a cash register and indicator, the combination, with a series of keys of fixed values pivoted upon horizontal axes, a series of tablet-rods and tablets actuated by said keys for exposing to view the value of any key operated, and a registering-wheel, of a bar extending transversely across the keys, with which the latter engage when moved on their pivots, the portions of said bar with which the different keys engage being arranged at different distances from said keys, and connecting mechanism between said bar and registering-wheel, whereby the operation of any key causes its tablet to be exposed to view and registers its value on said registering-wheel, substantially as described.

19. In a cash register and indicator, the combination, with a series of keys of fixed values pivoted upon horizontal axes, a series of tablet-rods and tablets actuated by said keys for exposing to view the value of any key operated, and a registering-wheel provided with a ratchet, of a bar extending transversely across the keys, with which the latter engage when moved on their pivots, the portions of said bar with which the different keys engage being arranged at different distances from said keys, and a pawl actuated by said bar and engaging with the ratchet of the registering-wheel, whereby the operation of any key causes its tablet to be exposed to view and registers its value on said registering-wheel, substantially as described.

20. In a cash register and indicator, the combination of a set of keys indicating cents, a wheel registering cents, a bar located transversely across and inclined relatively to the plane of said keys, connecting mechanism between said bar and registering-wheel, a set of keys indicating dollars, a wheel registering dollars, a bar located transversely across and inclined relatively to the plane of said dollar-keys, and connecting mechanism between said bar and dollar-registering wheel, whereby upon operating any key indicating cents its value is registered on the cent-registering wheel, and whereby upon operating any key indicating dollars its value is registered on the dollar-registering wheel, substantially as described.

21. In a cash register and indicator, the combination of a set of keys indicating cents, a wheel registering cents, a bar extending transversely across said keys and having a vertically-inclined operating side, connecting mechanism between said bar and registering-wheel, a set of keys indicating dollars, a wheel registering dollars, a bar extending transversely across said dollar-keys and having a vertically-inclined operating side, and connecting mechanism between said bar and dollar-registering wheel, substantially as and for the purpose described.

22. In a cash register and indicator, the combination of a set of keys indicating cents, a wheel registering cents and provided with a ratchet, a bar located transversely across and inclined relatively to the plane of said keys, a pawl actuated by said bar and engaging with the ratchet of said registering-wheel, a set of keys indicating dollars, a wheel registering dollars and provided with a ratchet, a bar located transversely across and inclined relatively to the plane of said dollar-keys, and a pawl actuated by said bar and engaging with the ratchet of the dollar-registering wheel, substantially as and for the purpose described.

23. In a cash register and indicator, the combination of a set of keys indicating cents, a wheel registering cents and provided with a ratchet, a bar extending transversely across said keys and having a vertically-inclined operating side, a pawl actuated by said bar and engaging with the ratchet of said registering-wheel, a set of keys indicating dollars, a wheel registering dollars and provided with a ratchet, a bar extending transversely across said dollar-keys and having a vertically-inclined lower side, and a pawl actuated by said bar and engaging with the ratchet of the dollar-registering wheel, substantially as and for the purpose specified.

24. In a cash register and indicator, the combination of a set of keys indicating cents, a set of tablet-rods and tablets corresponding in value to said keys and actuated thereby, a wheel registering cents, a bar located transversely across and inclined relatively to the plane of said keys, connecting mechanism between said bar and registering-wheel, a set of keys indicating dollars, a set of tablet-rods and tablets corresponding in value to said dollar-keys and actuated thereby, a wheel registering dollars, a bar located transversely across and inclined relatively to the plane of said dollar-keys, and connecting mechanism between said bar and dollar-registering wheel, substantially as and for the purpose described.

25. In a cash register and indicator, the combination of a set of keys indicating cents, a set of tablet-rods and tablets corresponding in value to said keys and actuated thereby, a wheel registering cents, a bar extending transversely across said keys and having a vertically-arranged operating side, connecting mechanism between said bar and registering-wheel, a set of keys indicating dollars, a set of tablet-rods and tablets corresponding in value to said keys and actuated thereby, a wheel registering dollars, a bar extending transversely across said dollar-keys and having a vertically-inclined operating side, and connecting mechanism between said bar and dollar-registering wheel, substantially as and for the purpose described.

26. In a cash register and indicator, the combination of a set of keys indicating cents, a set of tablet-rods and tablets corresponding in value to said keys and operated thereby, a wheel registering cents and provided with a ratchet, a bar located transversely across and inclined relatively to the plane of said keys, a pawl actuated by said bar and engaging with the ratchet of said registering-wheel, a set of keys indicating dollars, a set of tablet-rods and tablets corresponding in value to said dollar-keys and operated thereby, a wheel registering dollars and provided with a ratchet, a bar located transversely across and inclined relatively to the plane of said dollar-keys, and a pawl actuated by said bar and engaging with the ratchet of the dollar-registering wheel, substantially as and for the purpose described.

27. In a cash register and indicator, the combination of a set of keys indicating cents, a set of tablet-rods and tablets corresponding in value to said keys and operated thereby, a wheel registering cents and provided with a ratchet, a bar extending transversely across said keys and having a vertically-inclined operating side, a pawl actuated by said bar and engaging with the ratchet of said registering-wheel, a set of keys indicating dollars, a set of tablet-rods and tablets corresponding in value to said dollar-keys and operated thereby, a wheel registering dollars and provided with a ratchet, a bar extending transversely across said dollar-keys and having a vertically-inclined operating side, and a pawl actuated by said bar and engaging with the ratchet of the dollar-registering wheel, substantially as described, and for the purpose specified.

28. The combination, with the operating-keys indicating cents, of the bar L, inclined relatively to the plane of said keys, cent-registering wheel G, provided with a ratchet, J, and dog d, actuated by the bar L and engaging with said ratchet J, substantially as and for the purpose described.

29. The combination, with the set of operating-keys indicating cents and the set of tablet-rods carrying tablets indicating cents, of the bar L, inclined relatively to the plane of said keys, cent-registering wheel G, provided with a ratchet, J, and dog d, actuated by the bar L and engaging with said ratchet J, substantially as described, and for the purpose specified.

30. The combination of the set of operating-keys indicating cents, bar L, inclined relatively to the plane of said keys and operated thereby, cent-registering wheel G, provided with a ratchet, J, dog d, actuated by the bar L and engaging with said ratchet J, the set of keys indicating dollars, the bar L, inclined relatively to the plane of said keys and operated thereby, the dollar-registering wheel provided with a ratchet, J, and the dog d, actuated by said bar L and engaging with the ratchet J of the dollar-registering wheel, substantially as and for the purpose described.

31. The combination of the set of operating-keys indicating cents and the set of tablet-rods provided with tablets indicating cents, bar L, inclined relatively to the plane of and operated by said keys, cent-registering wheel G, provided with a ratchet, J, dog d, actuated by the bar L and engaging with said ratchet J, the set of keys indicating dollars, and tablet-rods provided with tablets indicating dollars, the bar L, inclined relatively to the plane of and operated by the dollar-keys, the dollar-registering wheel G, provided with a ratchet, J, and the dog d, actuated by said bar L and engaging with the ratchet J of the dollar-registering wheel, substantially as and for the purpose described.

32. The combination, with the registering-wheels G H, each provided with a ratchet-wheel, J, of the rock-shaft W, extending transversely across said registering-wheels and provided at one end with an arm, n, adapted to engage with a pin, m, upon the registering-wheel G, and upon its opposite end with an arm, o, carrying a spring-dog, p, engaging with the ratchet-wheel J of the registering-wheel H, substantially as and for the purpose described.

33. In a cash-register, the combination, with a series of operating-keys, the vibrating frame C, actuated by the operation of any one of said keys and provided with a rod, U, of the brake-shoe T and a brake-wheel, S, secured to the hub of the registering-wheel, and with which said shoe is arranged to engage, substantially as and for the purpose described.

34. The combination and arrangement of the wing E, gong-hammer B', gong F, extension C', with its nose r, dog s, arm t, draw-bar D', and vibrating frame C, substantially as and for the purpose described.

35. In a cash register and indicator, the combination of a series of keys, a vibrating frame operated by said keys, a till-compartment having a hinged lid, and locking and tilting mechanism interposed between said lid and vibrating frame, whereby the operation of any one of the keys unlocks the lid and throws it open, substantially as described.

36. The combination and arrangement of the hinged lid G', till-compartment F', spring-bolt a', draw-bar b', bell-crank c', vibrating arms e', and vibrating frame C, substantially as and for the purpose described.

37. In a cash-register, the combination, with a series of keys, a registering-wheel and connections between them, a brake-rim connected with the registering-wheel, and a co-operating brake, of a bar arranged to be operated by all the keys of the series connected with said brake-shoe, whereby upon the operation of any key the brake will be applied, substantially as described.

JOHN H. PATTERSON.

Witnesses:
WILLIAM B. SULLIVAN,
FRANK D. FOWLER.